J. D. CUSTER.
ROTARY SAW GRINDING AND POLISHING MACHINE.
No. 30,209. Patented Oct. 2, 1860.
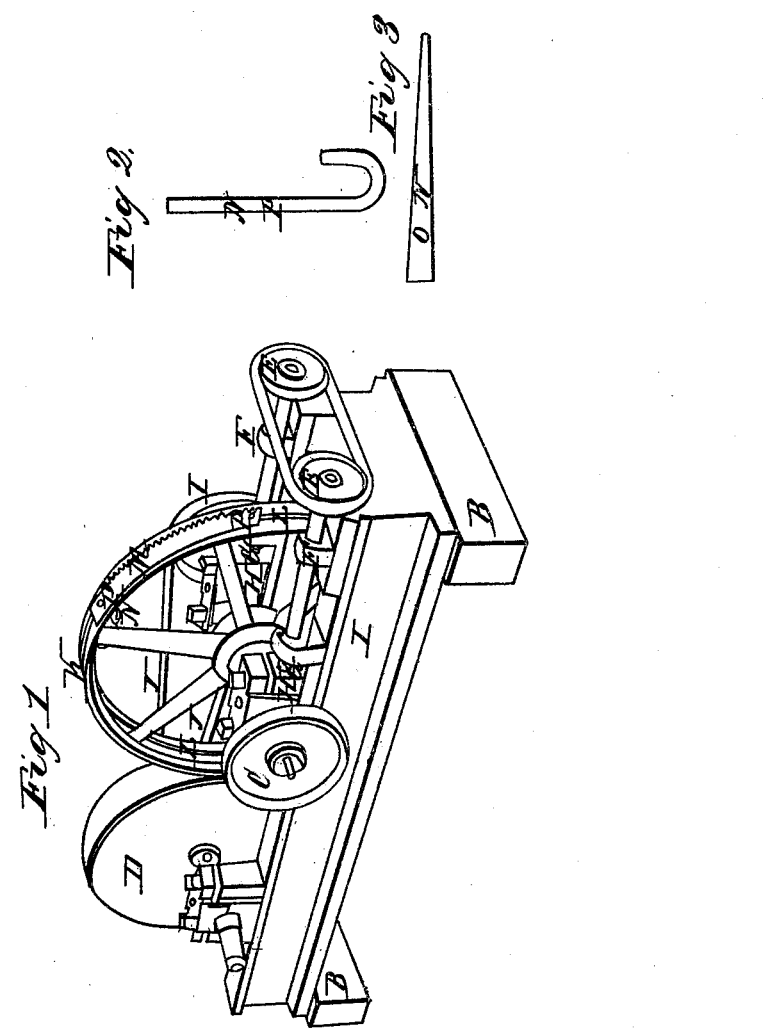
Witnesses.
L. E. Corson
D. Vanbout
Inventor.
J D Custer

UNITED STATES PATENT OFFICE.

J. D. CUSTER, OF NORRISTOWN, PENNSYLVANIA.

SAW-GRINDING MACHINE.

Specification of Letters Patent No. 30,209, dated October 2, 1860.

*To all whom it may concern:*

Be it known that I, J. D. CUSTER, of Norristown, in the county of Montgomery and State of Pennsylvania, have invented a new and Improved Machine for Grinding and Polishing Saws; and I do hereby declare that the following is a full, clear, and exact description of the construction and operation of the same, reference being had to the annexed drawings, making a part of this specification, in which—

Figure 1, is a perspective view; Fig. 2, a longitudinal view; and Fig. 3, a longitudinal view.

The nature of my invention consists in constructing a wheel of proper diameter, and face, to admit of bending, and laying the saws, on the face of the wheel, and fastening them on it with bevel headed hooks, or otherwise, so as to hold them tight on the face of the wheel while it revolves in contact with a revolving, traversing, grind stone, or polishing wheel, or polishing belt.

To enable others skilled in the art to make and use my invention, I will proceed to describe its construction and operation.

I construct my saw grinding and polishing wheels, out of cast iron, or any suitable material. For grinding the largest saws, I make the wheel about sixteen feet diameter, and about twelve inches on the face, so that a thick saw will bend around it conveniently; and for grinding small thin saws, I make the wheels about four feet diameter, &c.

I will now refer to the annexed drawings, and to the letters of reference marked thereon.

Figure 1, is a perspective view of the machine.

A, Fig. 1, is the bed plate, or foundation of the machine.

B, B, are end walls on which the bed plate rests.

C, is the driving pulley, on the end of the saw grinding wheel shaft. For the small wheels, this pulley, is sufficiently powerful with a good belt, to move the wheel regularly and steadily, but for the large saw grinding wheels, I put a spur cog wheel on instead of this pulley, and apply a pinion to the cogs of it, and a pulley to the shaft of this pinion, so as to obtain a powerful, and uniform rotary motion of the largest wheels I may wish to use.

D, is the grindstone. I use any common grindstone, and give it a traverse motion of its shaft, on its pedestals. I use any of the well known traverse gearings, to give the proper traverse motion to the grindstone, so as to bring the whole face of the stone in operation on the narrowest saws, so that the stone will always keep true on its face. I use a bonnet on the inside of each of the pedestals, in which the shaft of the grindstone traverses, so as to cover the part of it which traverse, so that no dirt, nor sand from the stone, can get on it. Said bonnets, may also be used on the outside of said pedestals, to keep the shaft clean, outside.

E, E, are pulleys on the ends of the feeding screws, with the feeding belt on them, the feeding screws run in pieces, F, F, which are bolted on the bed plate A.

G, G, are shoes, in the elevated ends of which the feeding screws run by journals on the ends of them, which reach through pieces G, G, and are kept in place by collars and pins, which run through the ends of the said journals, so as to keep the collars on them when the screws are turned back to draw the wheel away from the grindstone.

The pulleys E, E, may be replaced by spur wheels and have a wheel placed between them, so as to gear in them so as to work both feeding screws at the same time, and at a uniform rate; or my saw grinding wheels, may also be fed up to the stone by racks, and pinions, and endless screws, &c.

In order to feed up my saw grinding wheel at a proper angle to the stone, so as to grind the saws thick on the edge, and thin along the back, I make the feeding gear, so that I can slip the feeding belt, pinion, or screw, a little, on one side, so that I can feed up one side a little ahead of the other, when it is necessary for grinding such saws. I also accomplish the same results, by placing strips of sheet iron, tin, or paper, under one side of the saws, along the back, where it is necessary to grind them thin.

The pedestals H, H, Fig. 1, stand on shoes G, G, and they are kept in place by a bolt coming up through shoes G, G, right into the center of each pedestal, under the saw grinding wheel journal, so as to allow the pedestals to revolve on said shoes around said center bolts, whenever one side of the wheel is fed up ahead of the other. The shoes G, G, hook under the flanges of the bed plate A, so as to keep them in place.

I, Fig. 1, is a pulley on the right side of the machine, on the saw grinding wheel shaft, on which a belt runs, which drives the grindstone, but I run the grindstones, by any other belt from line shafting &c. On the outer end of the shaft, outside pulley I, is a belt (not shown) which runs forward to the grindstone, and drives a pulley, (not shown in the drawing) with a crank pin in it, to which crank pin, is a connecting rod attached, which takes hold of the center of the pulley on the end of the grindstone shaft, by a swivel joint, and gives the grindstone the proper traverse motion. But I use any other traverse gearing, which will answer as well.

J, J, is the belt which drives the grindstone.

K, Fig. 1, is the saw grinding wheel. I construct it of castiron, or any suitable material. For grinding large thick saws, I make it about fourteen, or sixteen feet, diameter, and one foot face, and for small thin saws, I make them three or four feet diameter. I cast the wheels solid, or, I cast the center, arms, and rim, or face, in pieces and bolt, or key them together, as may be desired. When the wheel is cast solid or all in one piece, I grind, or turn up the face of it, true, and cut a small slot all around the face of it, about the center of the face. This slot I cut through the face, excepting at the arms where the casting is made thick so as not to cut through, and so as to hold the rim together. When the rim is cast in segments, said slot can be planed in. The slot in the face of said wheel, should not be any wider than the hooks require, to hold down the saws, as a thin saw would be drawn into a wide slot by the hooks which fasten them down. For convenience, a number of slots, and holes may be required in the face of said saw grinding wheel, which slots, and holes, may be put in at any time as they are wanted. At L, L, Fig. 1, the said slot is shown cut through the rim, or face, of the wheel; and the teeth are also shown at L, cast on the inside, or under the face of the wheel, on both sides of the slot. If more than one slot is to be cut in the face of said wheel, those holding teeth, must be cast accordingly, so that they will extend on both sides of each slot, as they are indispensably necessary, to keep the saws from slipping around the face of the wheel, when they come in contact with the grindstone, &c.

M, Fig. 1, is a hand saw, fastened on the face of the wheel K, by means of two bevel headed hooks P, P, and two pins N, N, one of which is shown at N, Fig. 1, and at N, Fig. 3. The hook P, is shown at Fig. 2. The hook P, is a very important part of this arrangement as it enables me to put saws on, and take them off, the wheel, in a very little time. It is drawn down by the pin N, and if the hooks are leaned a little back and forward, so that the pin of the back hook, catches a holding tooth, so as to draw the hook back a little, and the pin of the forward hook, catches a holding tooth, a little forward of the hook, so as to draw it forward, it draws the saw tight down on the face of the wheel, and also draws it lengthwise, so as to cause it to lie close to the face of the wheel from one end to the other. Saws may be ground on said wheel, by fastening the forward end only, and allow the other end to drag around against a stationary outside rim, or without such a rim, but for long saws, it is best to fasten both ends. All short saws which do not require holes in both ends, can be ground by fastening the forward end only, as above stated, or the holes can be cut off after they are ground; the blade being cut that much too long, so as to allow of the hole being cut off. The holes in the saws must be countersunk, so that the heads of hooks P, will lie down even with the saw, or there may be recesses cut in the face of the grinding wheel, for the ends of the saws to lie in, so that the saw need not be countersunk at the holes. The holes in the saws may be tapped, and bolts screwed in from under the face of the wheel. All of those plans will answer to fasten saws on my saw grinding wheel, but none of them is equal to the hooks, and keys, above described. I intend to apply this hook and key to fastening saws on any other saw grinding machine, for which they are adapted, as they will apply to many machines now in use.

For polishing saws, after they are ground, I apply an emery belt, or polishing band, to the face of the grindstone, so as to fit tight around the grindstone, or so as to be long enough to run on the face of the grindstone as one pulley, and back, or up, over another pulley which will keep it in place, and tight enough to keep the grindstone from slipping in it, while in operation. This is a very effective plan, for grinding and polishing saws, on one, and the same machine; but when there is work sufficient for two machines, it is best to have one machine for grinding, and another for polishing saws. A machine for polishing only, must have a polishing wheel, instead of a stone. I am enabled to grind, and polish all kinds of long, and short, saws, with the greatest perfection, and at the most rapid rate. The back saws, and other short saws, I make in long pieces, and cut them to the proper length after they are ground, and polished; so as to require less fastening on the wheel.

The operation of my rotary saw grinding and polishing machine, needs but little more description, as it is easily understood. The saws should be all of one thickness, which are put on the wheel at one time. The wheel must be started at a speed which will grind, so as to leave no waves on the saws, and the grindstone, should run from the saw grinding wheel at its bottom while the saw wheel runs toward the stone, at its bottom, so as to get as much motion of the stone on the saw, as possible without running the grindstone too fast, so as to break it. When one side of a wheel full of saws, are ground they may be cleaned off, and polished, as above stated; or they may be taken off, and turned up, and fastened on so as to grind the other side of them, &c.

What I claim as my invention and desire to secure by Letters Patent, is—

The slotted wheel K, constructed as described, and operated in connection with the hook P, and pin N, in front of a traversing grindstone, for grinding and polishing saws, as set forth.

J. D. CUSTER.

Witnesses:
L. E. CORSON,
B. F. VAN COURT.